(12) United States Patent
DeJarnette et al.

(10) Patent No.: US 7,851,051 B2
(45) Date of Patent: Dec. 14, 2010

(54) ROOFING MATERIAL

(75) Inventors: Daniel C. DeJarnette, Bessemer, AL (US); Richard Allen Chasteen, Jr., Northport, AL (US); Michael L. Bryson, Independence, MO (US)

(73) Assignee: Elk Premium Building Products, Inc., Dallas, TX (US)

( * ) Notice: Subject to any disclaimer, the term of this patent is extended or adjusted under 35 U.S.C. 154(b) by 12 days.

(21) Appl. No.: 11/053,718

(22) Filed: Feb. 8, 2005

(65) Prior Publication Data

US 2006/0185298 A1   Aug. 24, 2006

(51) Int. Cl.
*B32B 27/00* (2006.01)
(52) U.S. Cl. .................. 428/212; 428/430; 428/480; 428/481; 52/518; 52/557
(58) Field of Classification Search .............. 428/212, 428/430, 480, 481; 52/518, 557
See application file for complete search history.

(56) References Cited

U.S. PATENT DOCUMENTS

| | | | | |
|---|---|---|---|---|
| 3,474,625 A | * | 10/1969 | Bennett et. al. | ............. 405/270 |
| 4,212,913 A | * | 7/1980 | Auten | .......................... 442/44 |
| 4,599,258 A | | 7/1986 | Hageman | |
| 4,778,718 A | * | 10/1988 | Nicholls | ..................... 442/394 |
| 4,848,057 A | | 7/1989 | MacDonald et al. | |
| 4,873,303 A | | 10/1989 | Blackwood et al. | |
| 4,908,403 A | * | 3/1990 | Spada et al. | ................. 524/818 |
| 5,049,416 A | * | 9/1991 | Wilczynski | .............. 427/208.4 |
| 5,053,452 A | * | 10/1991 | Spada et al. | ................. 524/707 |
| 5,122,567 A | * | 6/1992 | Spada et al. | ................. 524/818 |
| 5,232,530 A | | 8/1993 | Malmquist et al. | |
| 5,347,785 A | | 9/1994 | Terrenzio et al. | |
| 5,380,552 A | | 1/1995 | George et al. | |
| 5,434,009 A | | 7/1995 | Urbanek | |
| 5,456,785 A | | 10/1995 | Venable | |
| 5,822,943 A | | 10/1998 | Frankowski et al. | |
| 5,902,683 A | | 5/1999 | Sieloff | |
| 6,151,859 A | | 11/2000 | Nowacek | |
| 6,338,230 B1 | | 1/2002 | Davey et al. | |
| 6,341,462 B2 | | 1/2002 | Kiik et al. | |
| 6,436,510 B1 | | 8/2002 | Heidel et al. | |
| 6,530,189 B2 | | 3/2003 | Freshwater et al. | |
| 6,546,688 B1 | | 4/2003 | Parsons | |
| 6,708,456 B2 | | 3/2004 | Kiik et al. | |
| 6,709,994 B2 | | 3/2004 | Miller et al. | |
| 6,864,195 B2 | * | 3/2005 | Peng | ........................... 442/41 |
| 2002/0011043 A1 | | 1/2002 | Freshwater et al. | |
| 2002/0038531 A1 | | 4/2002 | Freshwater et al. | |
| 2003/0188503 A1 | | 10/2003 | Parsons | |
| 2003/0203145 A1 | | 10/2003 | Zanchetta et al. | |
| 2004/0014385 A1 | | 1/2004 | Greaves, Jr. et al. | |

FOREIGN PATENT DOCUMENTS

| | | |
|---|---|---|
| JP | 10277103 | 8/1998 |
| WO | WO 02/08539 | 1/2002 |

OTHER PUBLICATIONS

The Old House Web, "Repairing and Replacing Asphalt Shingle Roofs," http://www.oldhouseweb.com/stories/detailed/10149.html.
KTVE.COM, "What Siding is Best For Your Home?," http://www.ktvu.com/print/2152379/detail.html?use=print.
Tamiko Roofing Products, "Glossary," http://www.tamiko.com/glossary/glossaryalpha.asp.
Owens Corning, "Oakridge PRO Series Laminate Shingles Installation Instructions,"Pub. No. 15-RR-15959-E, Dec. 2001.
Center for Disease Control and Prevention, "Asphalt Fume Exposures During The Manufacture of Asphalt Roofing Products—Current Practices for Reducing Exposures," http://www.cdc.gov/niosh/01-127c.html.

* cited by examiner

*Primary Examiner*—David R Sample
*Assistant Examiner*—Lawrence D Ferguson
(74) *Attorney, Agent, or Firm*—Baker Botts LLP

(57) ABSTRACT

An improved roofing material having an upper and lower surface in which a thin layer comprising re-melted polypropylene or other suitable plastic is adhered to at least a portion of its lower surface.

17 Claims, No Drawings

ROOFING MATERIAL

BACKGROUND OF THE INVENTION

This invention relates to roofing material, and in particular to roofing shingles, having a novel backing which imparts improved characteristics such as resistance to damage from hail.

Roofing material has a front upper surface, at least a portion of which is intended to be exposed to weather, and a back lower surface facing in the direction opposite to the upper surface. Traditionally, the back, non-weather-exposed surface of roofing material such as shingles has been covered with finely ground mineral material ("fines") so that the asphalt backing does not adhere to contiguous roofing material when packaged for transport and storage. Such finely divided materials include mica flakes, copper slag, coal slag, sand, talc and silica dust.

In many regions the roofing materials on buildings, particularly the shingles on residential dwellings, are damaged by hail. The damage is caused by the impact of the hail stones on shingles resulting in visible cracking, tearing, snapping or imperceptible damage to the shingles' structure which can render the shingles less resistant to the elements of wind, rain, snow and ice. Frequently, such damage requires the costly replacement of roofing materials to prevent the elements from entering into the building.

U.S. Pat. No. 6,341,462 B2, to Kiik et al., discloses a roofing material with improved resistance to damage by hail having an energy-absorbing backing layer adhered to its lower surface. The backing layer of U.S. Pat. No. 6,341,462 comprises fiber and binding components with a combined weight ranging between 0.5 and 5 lbs. per square (100 square feet) of shingle material such that the exposed portion of a shingle made according to U.S. Pat. No. 6,341,462 appears more substantial and is, indeed, visibly thicker prior to application than products made without the backing layer.

It is an object of the present invention to provide roofing materials, particularly shingles, which have a reduced susceptibility to damage during hail storms, and are nevertheless lightweight and simple to manufacture and package using conventional equipment.

SUMMARY OF THE INVENTION

In accordance with the invention, the wear of roofing materials such as shingles is improved by applying to at least a portion of their back surface, i.e., the non-weather-exposed surface facing the roof, a thin layer of plastic, such as a thermoplastic. In a preferred embodiment, the backing layer is at least approximately 0.5 mils (thousandths of an inch) thick and comprises essentially re-melted polypropylene rolled material, pellets, flakes, fibers and/or any other suitable polypropylene material.

DETAILED DESCRIPTION

Conventional asphalt roofing materials, including shingles, are manufactured using a continuous process in which a base fibrous web, such as a sheet of roofing felt or fiberglass mat, is impregnated with a bituminous material and then coated on one or both surfaces with a weather-resistant bituminous coating material. The bituminous coating usually contains a mineral filler such as slate flour or powdered limestone. More than one fibrous sheet may be laminated within multiple bituminous layers. Usually, a suitable granular material, such as slate granules or mineral surfacing, is applied to the bituminous coating on the surface that will be exposed to the weather. Finely divided materials such as mica flakes, talc, silica dust or the like are adhered to the non-weather exposed surface of the roofing shingle to prevent sticking of the adjacent layers of the roofing material in packages. Alternatively, as disclosed in U.S. Pat. No. 6,341,462 patent, a backing layer comprising filler and binder materials may be adhered to the non-weather exposed surface of the roofing shingle in place of the fines to prevent sticking of adjacent roofing materials and provide additional strength and other advantageous physical properties.

In the present invention, at least a portion of the fines or composite backing layer is replaced with a thin layer of plastic or re-melted plastic which prevents sticking of adjacent packaged roofing materials, is simple to manufacture, lightweight, barely increases the overall thickness of the roofing material, and yet improves the physical properties of the roofing material by, among other things, decreasing its susceptibility to damage from hail. In one embodiment, at least approximately 0.5 mils of re-melted polypropylene rolled material, pellets, flakes, fibers and/or other suitable polypropylene material are applied to the back surface of the roofing material. More preferably, a layer of approximately 3-4 mils is applied. The weight addition of such a polypropylene backing is therefore only up to approximately 2 pounds per square, which is less than the weight of conventional roofing materials with a backing of fines. An inventive backing formed using a greater thickness of polypropylene or sufficient thickness of another plastic will have a weight comparable to, or possibly greater than, conventional roofing materials. Depending on its composition and thickness, the inventive backing may weigh between 0.1 and 10 lbs/square.

As noted above, one embodiment of the inventive backing may be formed using polypropylene in any one or more of several different forms. In addition to those mentioned above, spun bond polypropylene may also been used. Further embodiments may employ different suitable polyolefins or copolymers comprising at least one polyolefin: for example, polyethylene, polyvinylchloride, ethylene vinyl acetate, acrylonitrile butadiene styrene ("ABS"), acetal, acetate, butyrate, nylon, polyalomer, polycarbonate, polystyrene, styrene-butadine-copolymers, polysulfone, propionate or polyvinyl chloride. In other embodiments, thermoset or elastic materials, such as sheets of ethylene propylene diene monomer rubber ("EPDM"), high density silicone rubber, thermoplastic rubber, elastomers or sprayable and curable acrylics may be used. Yet other embodiments may employ laminates or multilayers optimized to provide the desired adhesive, mechanical and other properties of the backing layer. For example, the backing may comprise a first layer of spun bond polypropylene coated with one or more layers of polyethylene or a layer of spun bond polypropylene with one or more polyethylene layers laminated thereto. Alternatively, the backing may comprise a nonwoven polyethylene terephthalate ("PET") mat that is coated with polyethylene.

The inventive backing material is applied to the face of the back of the shingle in place of the fines, granules or other standard backing material that is conventionally applied at the slating drum stage during shingle manufacturing. As such, the inventive shingles may be manufactured using a standard line where asphalt is coated on the moving web and mineral granules are dropped on the upper surface of the hot asphalt coated web. A preferred application technique for the inventive backing is similar to the current industry practice of applying fines, granules or other standard backing material, except that plastic pellets, flakes and/or fibers may be substituted for the fines, granules or other standard backing material. However, any other suitable method of application may be used, including applying one or more layers of extruded or pre-melted plastic to the shingle.

In a preferred embodiment, the inventive backing is formed from at least approximately 0.5 mils of polypropylene that is preferably greater than 2 mils, and more preferably 3-4 mils. Since polypropylene has a melting point of approximately 350° F., while the asphalt coating on the moving web is typically maintained at about 400° F. during shingle manufacturing, certain polypropylene rolled material, pellets, flakes and/or fibers melt upon contact with the asphalt coating, thereby forming a molten layer of substantially uniform thickness that covers part or all of the asphalt surface. As polypropylene-coated roofing material is moved through the production process, the molten polypropylene cools to form a continuous resolidified layer of substantially uniform composition and thickness that is adhered to the back of the shingle. Pigments and other additives may combined with the polypropylene, as needed, preferably in pellet form, to change the color of the polypropylene layer and to provide enhanced resistance to UV damage, though the black color typically used to minimize edge visibility is inherently a good UV inhibitor. In the above-described process for producing polypropylene-backed roofing material, suitable plastics with a melting point below about 400° F. may be substituted for or mixed with the polypropylene rolled material, pellets, flakes and/or fibers. Furthermore, plastic materials with melting points above 400° F., such as EDPM, or certain polypropylene materials with higher melting points, may be used so long so long as molten asphalt adheres to such materials at the typical manufacturing temperature of around above 400° F.

It is known in the art to manufacture roofing shingles with an adhesive or sealant disposed on the upper edge region of the upper surface of the shingle, such that in an assembled roof comprising multiple courses of shingles, the lower edges of next course of shingles will overlap and cover the adhesive, thereby resulting in adhesion between the two courses. Alternatively, it is known to manufacture shingles with the adhesive on the lower portion of the back surface of the shingle to obtain the same result. In the present invention, to maintain good adhesion the shingles may have an adhesion or sealing region at the lower portion of the back surface of the shingle that does not include the inventive backing material. Instead, the adhesion or sealing region is covered with conventional fines.

Shingles made with the polypropylene backing described herein have better tear strength than the 1800-2100 grams that is typical of standard shingles backed with fines. The tear strength of the polypropylene-backed shingles is typically in excess of 3000 grams at the point of manufacture which is comparable to or better than that of shingles made with a comparable thickness of the composite backing of U.S. Pat. No. 6,341,462. The inventive shingles are also less susceptible to machine breaks and fractures and tears during field application, i.e., they better tolerate the rigors of shingle installation, than conventional shingles. Further, the inventive shingles provide enhanced impact resistance despite their light product weight, provide increased nail holding ability and maintain structural integrity at elevated temperatures. Also, the polypropylene sheet applied to the back of the shingle is water impervious. Thus an enhanced impact resistant seal against water penetration is provided.

The inventive backing described herein may be applied to any design or formulation of roofing material such as built up roofing materials, roll roofing and modified roll products, but it is particularly effective as a shingle backing. Shingles manufactured with such a backing that partially or fully covers their lower surface, demonstrate enhanced physical properties even though the internal composition of the shingle remains unchanged. In contrast to the shingles manufactured using the backing layer of U.S. Pat. No. 6,341,462, the plastic-backed shingles described herein are no more substantial than products manufactured with a fine sand backing, thereby maintaining familiar handlability and minimizing the need for packaging adjustments.

EXAMPLES

Conventional Capstone® and Raised Profile® shingles manufactured by Elk Premium Building Products, Inc. were prepared using either of mat nos. 1.7 or 2.3, having mat basis weights of 1.7 and 2.3 pounds/100 square feet, respectively, and comprising 15, 20 or 100% formula FLX™ and a polypropylene backing of 2-4 mils, where FLX™ is a proprietary asphalt coating developed by Elk that provides improved handling and strength. The lesser amounts of FLX™ were used in the samples having the inventive backing. Raised Profile® and Domain Winslow® shingles manufactured by Elk, were also tested without the inventive backing for comparison purposes.

Rolled polypropylene manufactured by DEKU Kunststoff GmbH was used to make the inventive coatings. Fire and impact tests were run on these polypropylene-backed samples, as shown in Tables 1 and 2, respectively. The fire tests shown in Table 1 were performed per ASTM E108/UL 790 Class A burning brand specifications. The time indicated in the final column being the time in minutes when the burning stopped entirely (a pass) or the underside of the deck ignited (a fail). The impact test shown in Table 2 were performed per UL 2290, Class 4. As noted above, standard shingles manufactured by Elk were also tested for comparison purposes. Tables 1 and 2, below show the results of the fire and impact testing, respectively, and demonstrate the comparable or improved performance of the inventive shingles as compared to standard shingles.

TABLE 1

| Test # | Product | Mat | FLX % | Granules | Backing | Time (minutes)/ Result |
|---|---|---|---|---|---|---|
| 1 | Capstone | 1.7 | 20 | Slate | 4 mil pp | 44/Pass |
| 2 | Capstone | 2.3 | 20 | Slate | 4 mil PP | 40/Pass |
| 3 | Raised Profile | 2.3 | 100 | Standard | Standard | 39/Fail |
| 4 | Capstone | 2.3 | 15 | Standard | 4 mil PP | 37/Pass |
| 5 | Capstone | 1.7 | 15 | Standard | 4 mil PP | 40/Pass |
| 6 | Raised Profile | 1.7 | 20 | Standard | 3 mil PP | 42/Pass |
| 7 | Raised Profile | 1.7 | 20 | Standard | 3 mil PP | 40/Pass |

TABLE 2

| Test # | Product | Mat | FLX % | Granules | Backing | Result |
|---|---|---|---|---|---|---|
| 1 | Capstone | 1.7 | 15 | Standard | 3 mil PP | Pass |
| 2 | Capstone | 2.3 | 15 | Standard | 3 mil PP | Pass |
| 3 | Capstone | 1.7 | 15 | Standard | 4 mil PP | Pass |
| 4 | Capstone | 2.3 | 15 | Standard | 4 mil PP | Pass |
| 5 | Capstone | 2.3 | 20 | Slate | 3 mil PP | Pass |
| 6 | Capstone | 1.7 | 20 | Slate | 4 mil PP | Pass |
| 7 | Capstone | 2.3 | 20 | Slate | 4 mil PP | Pass |
| 8 | Capstone | 1.7 | 20 | Slate | 3 mil PP | Pass |
| 9 | D. Winslow | 2.3 | 100 | Standard | Standard | Pass |
| 10 | Raised Profile | 2.3 | 100 | Standard | Standard | Fail |
| 11 | Raised Profile | 2.3 | 20 | Standard | 4 mil PP | Pass |
| 12 | Raised Profile | 1.7 | 20 | Standard | 4 mil PP | Pass |

TABLE 2-continued

| Test # | Product | Mat | FLX % | Granules | Backing | Result |
|---|---|---|---|---|---|---|
| 13 | Raised Profile | 2.3 | 20 | Standard | 3 mil PP | Pass |
| 14 | Raised Profile | 1.7 | 20 | Standard | 3 mil PP | Pass |
| 15 | Capstone | 1.7 | 15 | Standard | 2 mil PP | Pass |
| 16 | Raised Profile | 1.7 | 20 | Standard | 2 mil PP | Fail |

It should be understood that the foregoing descriptions and examples are illustrative, and that compositions other than those described above can be used as the backing while still utilizing the principles underlying the present invention. For example, plastics other than polypropylene that have a suitable melting temperature and mechanical properties may be used to formulate the backing layer. Furthermore, the backing layer may be composed of a combination of polypropylene and other suitable plastic or plastics. Moreover, the backing layer may be applied to various types of roofing products.

We claim:

1. In an asphalt roofing shingle material having a front surface, at least a portion of which is intended to be exposed to weather, and back surface facing in a direction opposite to the front surface, the improvement comprising a thin layer consisting essentially of a plastic material covering at least a portion of said back surface, said layer being between about 2 and 4 mils in thickness, wherein the plastic material is adhered to the asphalt roofing shingle material through application of heat and without an intervening adhesive, and wherein said plastic material consists essentially of a thermoplastic material and said thermoplastic material consists essentially of polypropylene.

2. A roofing material according to claim 1 wherein said thin layer comprises re-melted polypropylene rolled material, pellets, flakes or fibers.

3. A roofing material according to claim 1 wherein said thin layer is between about 3 and 4 mils in thickness.

4. A roofing material according to claim 2 wherein said thin layer is between about 3 and 4 mils in thickness.

5. A roofing material according to claim 1 wherein said thin layer further comprises a pigment.

6. A roofing material according to claim 1 wherein the roofing material comprises a bituminous material.

7. A roofing material according to claim 2 wherein the roofing material comprises a bituminous material.

8. A roofing material according to claim 5 wherein the roofing material comprises a bituminous material.

9. A roofing material according to claim 3 wherein the roofing material comprises a bituminous material.

10. A roofing material according to claim 1 wherein the thin layer covers the entire back surface.

11. A roofing material according to claim 3 wherein the thin layer covers the entire back surface.

12. A roofing material according to claim 1 wherein the thin layer does not cover at least a portion of the lower edge of the back surface.

13. A roofing material according to claim 3 wherein the thin layer does not cover at least a portion of the lower edge of the back surface.

14. A roofing material according to claim 1 wherein the thin layer comprises more than one layer.

15. A roofing material according to claim 1 wherein the thin layer comprises spunbond polypropylene.

16. A roofing material according to claim 1 wherein said plastic material melts at less than about 400° F.

17. A roofing material according to claim 1 wherein said plastic material adheres to a bituminous material at about 400° F.

* * * * *

UNITED STATES PATENT AND TRADEMARK OFFICE
CERTIFICATE OF CORRECTION

PATENT NO. : 7,851,051 B2  Page 1 of 1
APPLICATION NO. : 11/053718
DATED : December 14, 2010
INVENTOR(S) : Daniel C. DeJarnette, Richard Allen Chasteen, Jr. and Michael L. Bryson It is certified that error appears in the above-identified patent and that said Letters Patent is hereby corrected as shown below:

At Column 6, Line 28:

"spunbond" should read --spun bond--

Signed and Sealed this
Twenty-second Day of February, 2011

David J. Kappos
*Director of the United States Patent and Trademark Office*